United States Patent [19]

Hung et al.

[11] Patent Number: 4,954,132

[45] Date of Patent: Sep. 4, 1990

[54] TINTED CONTACT LENS AND METHOD OF TINTING WITH REACTIVE DYE AND QUATERNARY AMMONIUM SALT

[75] Inventors: William M. Hung; Kai C. Su, both of Alpharetta, Ga.

[73] Assignee: Ciba-Geigy Corporation, Ardsley, N.Y.

[21] Appl. No.: 323,355

[22] Filed: Mar. 14, 1989

[51] Int. Cl.$^5$ .................................................. D06P 5/00
[52] U.S. Cl. ............................................ 8/507; 8/543; 8/549; 8/606; 8/509
[58] Field of Search .................... 8/507, 543, 549, 606

[56] References Cited

U.S. PATENT DOCUMENTS

| | | | |
|---|---|---|---|
| 3,476,499 | 11/1969 | Wichterle | 8/507 |
| 4,468,229 | 8/1984 | Su | 8/507 |
| 4,553,975 | 11/1985 | Su | 8/507 |
| 4,559,059 | 12/1985 | Su | 8/507 |
| 4,668,240 | 5/1987 | Loshaek | 8/507 |

*Primary Examiner*—A. Lionel Clingman
*Attorney, Agent, or Firm*—Edward McC. Roberts; Irving M. Fishman

[57] ABSTRACT

An improvement in a process for preparing a contact lens tinted over at least a portion of its surface, having the steps of forming a tinting solution having a reactive dyestuff and applying the tinting solution to a polymeric hydrogel contact lens material, wherein the improvement comprises adding an effective amount of an ammonium quaternary salt to the tinting solution before the applying step.

10 Claims, No Drawings

TINTED CONTACT LENS AND METHOD OF TINTING WITH REACTIVE DYE AND QUATERNARY AMMONIUM SALT

BACKGROUND OF THE INVENTION

The present invention relates to an improvement in a process for preparing a tinted contact lens. In particular, the invention concerns contact lenses comprising polymeric lens material in which reactive dyestuffs have been covalently bonded to monomer units of the polymer backbone. This invention is of particular interest in the area of so-called hydrophilic or "soft" contact lenses, commonly referred to as hydrogel lenses.

There are many known methods for tinting or coloring contact lenses. For example, a coloring agent, such as dyestuff or pigment, may be dispersed in a monomer precursor or polymer matrix. This method is typically unsuitable for use in hydrophilic contact lenses, however, because the coloring agent leaches from the plastic upon presence of water in the lens.

Another known method of coloring lenses is printing or otherwise applying the coloring agent to the lens surface. This method is also problematic, because a portion of the agent often becomes dissociated from the lens when the lens is placed in water. The primary cause of this problem is insufficient physical adhesion of the coloring agent to the surface. To counteract this problem, it is necessary to use a large amount of agent in the coloring process. Furthermore, while the above-referenced patents to Su disclose a method of bonding agent to lens material, they do not teach a method for applying chlorotriazine dyes to lens material. However, surface tinting remains the preferred method of applying color to contact lenses.

There exists a need, therefore, for an improved tinted contact lens and a method of making the same.

SUMMARY OF THE PRESENT INVENTION

The present invention relates to an improvement in the tinting of contact lenses. Successful methods of tinting contact lenses are set forth in U.S. Pat. Nos. 4,468,229, 4,553,975 and 4,559,059, all to Su, and these patents are incorporated herein by reference.

According to the present invention, the bonding of a reactive dyestuff to polymeric lens material may be enhanced by providing an effective amount of an ammonium quaternary salt during the tinting process. Examples of acceptable ammonium quaternary salts include triethylbenzylammonium chloride, tetrabutylammonium hydrogen sulfate, phenyltrimethylammonium chloride, benzyltributyl ammonium chloride, tetrabutylammonium bromide, and tetramethylammonium chloride. It has been found that the use of such a catalyst results in increased bonding of the dyestuff to the lens material, which in turn decreases the cost of producing a tinted lens and also provides a lens having enhanced coloring. The present improvement has been found to be particularly useful in bonding chlorotriazine dyestuff to lens material.

Therefore, it is an object of the present invention to provide an improved tinted contact lens and a method of making the same.

DETAILED DESCRIPTION OF THE INVENTION

According to the present invention, a process for preparing a contact lens tinted over at least a portion of its surface may be improved by the presence of an ammonium quaternary salt catalyst in the tinting solution during the tinting procedure.

In most tinting procedures, such as those set forth in the aforementioned patents to Su, a solution of an effective amount of a reactive dyestuff is covalently bonded to the monomer units of polymeric lens material. For example, a practitioner may place a pre-formed contact lens in a tinting solution. In a standard tinting procedure, a contact lens is rinsed with deionized water and placed in a dry vial. Base solution (typically 10% $Na_3PO_4.12H_2O$ (aq) solution) is added to the vial, followed by tinting solution. The vial is shaken in a shaker bath, and the lens removed. The lens is rinsed with deionized water and extracted with 10% glycerine (aq) solution at 80° C. for two hours. The lens is once again rinsed with water, then stored in saline. The ammonium quaternary salt catalyst of the present invention is preferably provided in the tinting solution prior to placement of the lens material therein.

A number of ammonium quaternary salts may be used in practicing the present invention, including, for example, triethylbenzylammonium chloride, tetrabutylammonium hydrogen sulfate, phenyltrimethylammonium chloride, benzyltributylammonium chloride, tetrabutylammonium bromide, and tetraethylammonium chloride.

In general, any polymeric material suitable for use in the preparation of a contact lens can be used in the present invention, so long as at least one of the monomeric components which form the material contains an exoskeletal functional group which can react with a reactive dyestuff molelcule. Examples of such functional groups commonly present in contact lens materials are the hydroxyl, amino, amide and thio groups, and functional derivatives thereof. Particularly suitable as monomers for this purpose are hydroxyalkyl esters of polymerizable unsaturated acids, such as acrylic, methacrylic, itaconic, fumaric and maleic acids. Among such esters, hydroxyethyl methacrylate (HEMA) has been used quite extensively.

Useful reactive dyes, according to the present invention, include those commonly referred to as "reactive dyes forming ether linkages." These dyes contain reactive groups which react with cellulose to form an ether linkage and are generally described in *Fiber-Reactive Dyes*, Chapter VI, by W. F. Beech, SAF International, Inc., New York (1970), incorporated herein by reference. U.S. Pat. No. 4,553,775 to Su also sets forth typical examples of commercially available dyes which may be used in accordance with the present invention.

Among the preferred reactive dyestuffs capable of being used in accordance with the present invention are those having the general formulae:

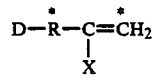

or

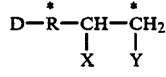

wherein

D is the radical of an organic dyestuff radical;

R is a divalent organic electron attracting group capable of causing electron withdrawal of the carbon atoms, thus activating the same;

X is hydrogen or halo; and

Y is a leaving group or mixtures thereof.

The radical D may advantageously be the radical of an azo, phthalocyanine, azomethine, nitro or anthraquinone dye.

The divalent group —R— is advantageously bonded directly to an aromatic nuclear carbon of D, or is bonded thereto via an aliphatic group such as an alkylene group, e.g., a lower alkylene group. Most preferably, —R— is directly bonded to a nuclear carbon atom of D.

Suitable divalent R groups include —CO—, —SO$_2$—, —SO—, —NHCO—, —NHSO$_2$—, —SO$_2$NH— and the like. Most preferably, —R— is —SO$_2$—, —SO$_2$NH—, —CO— or —NHCO—.

When X is halo, it is most preferably chloro or bromo.

Suitable leaving groups, Y, include —Cl, —Br, —OH, di-lower alkylamino,

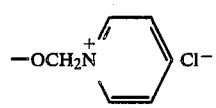

—SO$_2$-phenyl, —OSO$_3$-Z+ where Z is a cation, —O—SO$_3$R$_1$ or —OSO$_2$R$_1$ where R$_1$ in each case is alkyl, aryl, aralkyl or alkaryl.

Advantageously, where R$_1$ is alkyl, it is alkyl of 1 to 6 carbon atoms, preferably alkyl of 1 to 4 carbons, including for example, methyl, ethyl, isopropyl, butyl and the like. Where R$_1$ is aralkyl, it is preferably lower alkyl substituted phenyl, such as tolyl or xylyl, and where R$_1$ is alkaryl, it is preferably lower alkylenephenyl, such as benzyl or phenethyl.

Also, the use of chlorotriazine dyes, such as Cibacron ® Blue 3R available from Ciba Giegy Corporation, is contemplated by the present invention.

It is preferable that the tinting solution have a pH of at least 10 and a temperature from approximately 30° C. to 60° C. when applied to the lens.

The following examples will illustrate the present invention. These examples should be reviewed as illustrative only, without in any way limiting the scope of the instant invention.

EXAMPLE I

Two groups of 10 Cibasoft ® HEMA contact lenses (available from Ciba Vision Corporation) were tinted. The first group was placed in a tinting solution containing 1 ml of 0.1% Cibracon ® Blue 3R (aq) (a chlorotriazine type dye available from Ciba Geigy Corporation), 1 ml of Na$_3$PO$_4$.12H$_2$O (10% aq) and 0.1 ml of 5.0% tetrabutylammonium bromide. The second group was placed in an identical solution except the tetrabutylammonium bromide was omitted. Both groups were shaken for 30 minutes at 45° C. Each lens was then extracted three times with 10% glycerine at 80° C. for 30 minutes, once in deionized water at 80° C. for 30 minutes, and placed in buffered saline at 80° C. for 1 hour.

After extraction, the lenses from the first group having the tetrabutylammonium bromide catalyst visibly had substantially more color than those of the second group without the catalyst.

EXAMPLE II

The procedure of Example I was repeated using a fresh set of lenses, except that the Cibacron ® Blue 3R solution concentration was 0.5%. The lenses were visibly different before extraction and after. The lenses of the first group, which had the catalyst in its tinting solution, appeared very dark blue before extraction, and retained a distinct blue color even after extraction. The lenses of the second group, which had no catalyst in its tinting solution, appeared much lighter than the first group lenses before extraction, and became even lighter after extraction.

EXAMPLE III

Two groups (Groups I and II) of 5 Softcon ® contact lenses (a HEMA/PVP lens available from American Optical Corporation) were tinted according to the above-described standard procedure at 45° C. Group I was placed in a tinting solution comprising 2 ml of 0.1% of Ramazol ® (a blue dye solution available from Hoechst Celanese Corporation), 2 ml of 10% Na$_3$PO$_4$.12-H$_2$O (aq), and 0.2 ml of 5% tetrabutylammonium hydrogen sulfate. The dye solution was prepared by dissolving 0.1 g of a dyestuff having the formula:

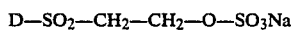

in 99 ml of water and 1 ml of concentrated HCl. Group II was placed in an identical tinting solution except the tetrabutylammonium hydrogen sulfate was omitted. The lenses were placed for 1 hour in their respective tinting solution, then extracted with 10% glycerine (aq) at 80° C. for two hours. In comparing the two groups after extraction, it was determined that the lenses of Group I, which had the tetrabutylammonium hydrogen sulfate catalyst in their tinting solution, had substantially better coloring than the lenses of Group II.

EXAMPLE IV

Two groups of 5 Softcon ® contact lenses were tinted according to the above-described standard procedure at 45° C. Group I was placed in a tinting solution comprising 2 ml of 0.5% Cibacron ® yellow F-G (available from Ciba Geigy Corporation), 2 ml of 10% Na$_3$PO$_4$.12H$_2$O (aq), and 0.2 ml of 5% tetrabutylammonium hydrogen sulfate. Group II was placed in an identical tinting solution except the tetrabutylammonium hydrogen sulfate was omitted. The lenses were soaked for 1 hour in their respective tinting solution, then extracted with 10% glycerine (aq) at 80° C. for two hours. In comparing the two groups after extraction, it was determined that the lenses of Group I, which had the tetrabutylammonium hydrogen sulfate catalyst in their tinting solution, had substantially better coloring than the lenses of Group II.

EXAMPLE V

Two groups of 5 Cibasoft ® HEMA contact lenses each were tinted according to the above-described standard procedure at 45° C. Group I was placed in a tinting solution comprising 1 ml of the Ramazol ® blue dye solution (set forth in Example III), 1 ml of 10% Na$_3$.PO$_4$.12H$_2$O (aq), and 0.1 ml of 5% tetrabutylammonium bromide (aq). Group II was placed is an identical tinting solution except that the tetrabutylammonium bromide was omitted. The lenses were soaked for 30 minute in their respective tinting solution, washed with deionized water and saline, extracted with 100 ml of 10% glycerine (aq) at 80° C. or two hours, washed again with 100 ml deionized water at 80° C. for 1 hour, and placed in 100 ml buffered saline at 80° C. for one hour. The lenses were then examined by visible spectrum. A distinct difference was seen between the groups. Group I, which had the catalyst in its tinting solution, was tinted intensely while Group II, which had no catalyst in its solution, tinted only very faintly.

EXAMPLE VI

Two groups of 5 Cibasoft ® HEMA contact lenses each were tinted according to the above-described standard procedure at 45° C. Group I was placed in a tinting solution comprising 1 ml of 0.05% Cibacron ® Navy F-G (available from Ciba Geigy Corporation), 1 ml of $Na_3PO_4 \cdot 12H_2O$ (aq), and 0.1 ml of 5% tetrabutyammonium bromide (aq). Group II was placed in an identical tinting solution except that the tetrabutylammonium bromide was omitted. The lenses were placed for 30 minutes in their respective solution, then washed with deionized water and buffered saline solution, extracted in 100 ml of 10% glycerine (aq) at 80° C. for two hours, washed again in 100 ml of deionized water at 80° C. for one hour, and placed in 100 ml buffered saline at 80° C. for one hour. The tinting results were examined by visible spectrum. The lenses of Group I, which were tinted in a solution having the catalyst, possessed a blue color. The lenses of Group III, which were tinted in a solution without a catalyst, had no visible color.

The above examples illustrate that the process for preparing a contact lens tinted over at least a portion of its surface may be improved by adding an ammonium quaternary salt to the tinting solution.

What is claimed is:

1. An improvement in a process for preparing a soft contact lens tinted over at least a portion of its surface having the steps of forming on aqueous tinting solution comprising a reactive dyestuff and applying said tinting solution to a polymeric hydrogel contact lens material, wherein the improvement comprises adding an effective amount of an ammonium quaternary salt to said tinting solution before said applying step.

2. The improvement of claim 1, wherein said ammonium quaternary salt is selected from the group consisting of triethylbenzylammonium chloride, tetrabutylammonium hydrogen sulfate, phenyltrimethylammonium chloride, benzyltributylammonium chloride, tetrabutylammonium bromide, and tetramethylammonium chloride.

3. The improvement of claim 1, wherein said tinting solution comprises a chlorotriazine dyestuff.

4. The improvement of claim 1, wherein said tinting solution having said ammonium quaternary salt therein has a temperature from between approximately 30° to 60° C. during said applying step.

5. The improvement of claim 1, wherein said tinting solution having said ammonium quaternary salt wherein has a pH of at least 10 during said applying step.

6. The improvement of claim 1, wherein said contact lens material is hydroxyethyl methacrylate.

7. A contact lens produced by a process which includes the improvement of claim 1.

8. An aqueous solution for tinting soft contact lenses, comprising effective amounts of a reactive dyestuff and an ammonium quaternary salt.

9. The improvement of claim 1 wherein said reactive dyestuff is of the formula:

$$D-R-C(X)=CH_2 \qquad (I)$$

or $$D-R-CH(X)-CH_2Y \qquad (II)$$

wherein

D is the radical of an organic dyestuff;

R is a divalent, organic, electron attracting group capable of causing electron withdrawal of the carbon atoms whereby the carbon atoms are activated selected from $-CO-$, $-SO_2-$, $-SO-$, $-NHCO-$, $-NHSO_2-$, $-SO_2NH-$;

X is hydrogen or halogen; and

Y is a leaving group selected from $-Cl$, $-Br$, $-OH$, di-lower alkylamino,

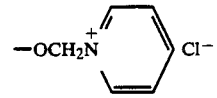

$-SO_2-$phenyl, $-OSO_3-$ $Z^+$ where Z is a cation, $-O-SO_3R_1$ or $-OSO_2R_1$ where $R_1$ in each case is alkyl, aryl, aralkyl or alkaryl;

or mixtures thereof;

said process further comprising:

maintaining said solution at a temperature from between approximately 30° to 60° C.; adding said contact lens material to said solution removing said contact lens material from said solution after a preselected time; and removing unreacted solution from said lens material.

10. The improvement of claim 1 wherein said reactive dyestuff is a halotriazine substituted with a dyestuff radical.

* * * * *